US008626813B1

(12) United States Patent
Swartzlander et al.

(10) Patent No.: US 8,626,813 B1
(45) Date of Patent: Jan. 7, 2014

(54) DUAL-PATH FUSED FLOATING-POINT TWO-TERM DOT PRODUCT UNIT

(71) Applicant: Board of Regents, The University of Texas System, Austin, TX (US)

(72) Inventors: Earl E. Swartzlander, Austin, TX (US); Jongwook Sohn, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 13/964,479

(22) Filed: Aug. 12, 2013

(51) Int. Cl.
*G06F 7/38* (2006.01)

(52) U.S. Cl.
USPC .......................................................... 708/501

(58) Field of Classification Search
USPC .......................................... 708/501, 523–524
See application file for complete search history.

(56) References Cited

U.S. PATENT DOCUMENTS

| | | | | |
|---|---|---|---|---|
| 6,332,186 | B1 * | 12/2001 | Elwood et al. ................ | 711/217 |
| 6,487,575 | B1 * | 11/2002 | Oberman ....................... | 708/504 |
| 6,842,765 | B2 * | 1/2005 | Enenkel et al. ............... | 708/501 |
| 8,037,118 | B2 | 10/2011 | Quinnell et al. | |
| 8,078,660 | B2 | 12/2011 | Quinnell et al. | |
| 8,161,090 | B2 | 4/2012 | Swartzlander, Jr. et al. | |
| 8,166,091 | B2 | 4/2012 | Swartzlander, Jr. et al. | |
| 2002/0107900 | A1 * | 8/2002 | Enenkel et al. ............... | 708/501 |

OTHER PUBLICATIONS

Sohn et al., Improved Architectures for a Floating-Point Fused Dot Product Unit, 2013 IEEE 21st Symposium on Computer Arithmetic, pp. 41-48, Apr. 7-10, 2013.

Min et al., "Fused Floating-Point Two-Term Sum-of-Squares Unit," 24th IEEE International Conference on Application-Specific Systems, Architectures and Processors, Jun. 5-7, 2013.
Sohn et al., "Improved Architectures for a Fused Floating-Point Add-Subtract Unit," IEEE Transactions on Circuits and Systems-1: Regular Papers, vol. 59, pp. 2285-2291, Apr. 12, 2012.
Min et al., "A Low-Power Dual-Path Floating-Path Fused Add-Subtract Unit," 46th Asilomar Conference on Signals, Systems and Computers, pp. 998-1002, Nov. 4-7, 2012.
Saleh et al., "A Floating-Point Fused Add-Subtract Unit," 2008 IEEE Midwest Symposium on Circuits and Systems, pp. 519-522, Aug. 10-13, 2008.
Saleh et al., "A Floating-Point Fused Dot-Product Unit," XXVI IEEE International Conference on Computer Design, pp. 427-431, Oct. 12-15, 2008.
Quinnell et al., "Bridge Floating-Point Fused Multiply-Add Design," IEEE Transactions on Very Large Scale Integration (VLSI) Systems, vol. 16, pp. 1726-1730, Nov. 19, 2008.

(Continued)

*Primary Examiner* — Tan V. Mai
(74) *Attorney, Agent, or Firm* — Robert A. Voigt, Jr.; Winstead, P.C.

(57) ABSTRACT

A fused floating-point dot product unit. The fused dot product unit includes an improved alignment scheme that generates smaller significand pairs compared to the traditional alignment due to the reduced shift amount and sticky logic. Furthermore, the fused dot product unit implements early normalization and a fast rounding scheme. By normalizing the significands prior to the significand addition, the length of the adder can be reduced and the round logic can be performed in parallel. Additionally, the fused dot product unit implements a four-input leading zero anticipation unit thereby reducing the overhead of the reduction tree by encoding the four inputs at once. The fused floating-point dot product unit may also employ a dual-path (a far path and a close path) algorithm to improve performance. Pipelining may also be applied to the dual-path fused dot product unit to increase the throughput.

19 Claims, 12 Drawing Sheets

(56) References Cited

OTHER PUBLICATIONS

Swartzlander, Jr., et al., "Fused Floating-Point Arithmetic for DSP," 42th Asilomar Conference on Signals, Systems and Computers, pp. 767-771, Oct. 26-29, 2008.

Swartzlander, Jr., et al., "FFT Implementation with Fused Floating-Point Operations," IEEE Transactions on Computers, vol. 61, pp. 284-288, Dec. 9, 2010.

Swartzlander, Jr., et al., "Floating-Point Implementation of Complex Multiplication," 43rd Asilomar Conference on Signals, Systems and Computers, pp. 926-929, Nov. 2-4, 2009.

Ji et al., "Comments on Leading-One Prediction with Concurrent Position Correct," IEEE Transactions on Computers, vol. 58, No. 12, Mar. 5, 2009.

Kornerup et al., "Correcting the Normalization Shift of Redundant Binary Representations," IEEE Transactions on Computers, vol. 58, No. 10, Feb. 25, 2009.

Bruguera et al., "Leading-One Prediction with Concurrent Position Correct," IEEE Transactions on Computers, vol. 48, No. 10, Oct. 1999.

Lang et al., "Floating-Point Multiply-Add-Fused with Reduced Latency," IEEE Transactions on Computers, vol. 53, No. 8, Aug. 2004.

Hokenek et al., "Second-Generation RISC Floating Point with Multiply-Add Fused," IEEE Journal of Solid-State Circuits, vol. 25, No. 5, Oct. 1990.

Montoye et al., "Design of the IBM RISC System/6000 Floating-Point Execution Unit," IBM J. Res. Develop., vol. 34, No. 1, Jan. 1990.

"IEEE Standard for Floating-Point Arithmetic," Aug. 29, 2008.

* cited by examiner

- BEFORE ALIGNMENT

- IF AB > CD

- IF AB < CD

- AFTER ALIGNMENT

* f = NUMBER OF SIGNIFICAND BITS
  diff = EXPONENT DIFFERENCE

| W vector | Leading Zeros | Pre-encoding Pattern |
|---|---|---|
| $0^k 11(x)$ | $k$ | $e_{i-1} g_i g_{i+1}$ |
| $0^k 10(1 \text{ or } 0)$ | $k$ | $e_{i-1} g_i e_{i+1}$ |
| $0^k 10^l(\bar{1})$ | $k+1$ | $e_{i-1} g_i e_{i+1}*$ |
| $0^k 1\bar{1}^l 1(x)$ | $k+l$ | $\bar{e}_{i-1} s_i g_{i+1}$ |
| $0^k 1 1^l 0(1 \text{ or } 0)$ | $k+l$ | $\bar{e}_{i-1} s_i e_{i+1}$ |
| $0^k 1 1^l 0^m(\bar{1})$ | $k+l+1$ | $\bar{e}_{i-1} s_i e_{i+1}*$ |

*CORRECTION NEEDED

FIG. 6

DUAL-PATH FUSED FLOATING-POINT TWO-TERM DOT PRODUCT UNIT

TECHNICAL FIELD

The present invention relates generally to floating-point fused dot-product units, and more particularly to a fused floating-point two-term dot product unit whose performance is improved and area and power consumption is reduced by fusing two multiply and one add operation as well as using a two-path addition algorithm.

BACKGROUND

Floating-point operations are widely used for advanced applications, such as 3D graphics, signal processing and scientific computations. These computations require a wide dynamic range of values. Fixed-point arithmetic is not sufficient for representing such a wide range of values, but floating-point arithmetic, such as that which is specified in the IEEE-754 standard for floating-point arithmetic, can represent a wide range of numbers from tiny fractional numbers to nearly infinitely huge numbers so that overflow and underflow are avoided. However, the floating-point operations require complex processes, such as alignment, normalization and rounding, which significantly increases the area, power consumption and latency. One solution is to merge or "fuse" several operations in one floating-point unit to reduce the area, power and latency by sharing the common logic of the operations. In order to improve the floating-point units, several fused units have been introduced: fused multiply-add, fused add-subtract, and fused dot product.

Unfortunately, despite these improvements to the floating-point units, such as the fused dot product unit, the current floating-point dot product unit is still expensive in terms of silicon area, power consumption and latency.

BRIEF SUMMARY

In one embodiment of the present invention, a floating-point fused dot product unit comprises a first multiplier tree adapted to multiply a first and second significand operands to produce a first significand pair. The floating-point fused dot product unit further comprises a second multiplier tree adapted to multiply a third and fourth significand operands to produce a second significand pair. Additionally, the floating-point fused dot product unit comprises a first multiplexer coupled to the first and second multiplier trees, where the first mulitplexer is configured to select a smaller significand pair of the first and second significand pairs. Furthermore, the floating-point fused dot product unit comprises a second multiplexer coupled to the first and second multiplier trees, where the second multiplexer is configured to select a greater significand pair of the first and second significand pairs. The floating-point fused dot product unit additionally comprises an alignment and sticky unit coupled to the first multiplexer, where the alignment and sticky unit is configured to align the smaller significand pair and perform sticky logic on the smaller significand pair to generate a first sticky bit. In addition, the floating-point fused dot product unit comprises a sticky unit coupled to the second multiplexer, where the sticky unit is configured to perform sticky logic on the greater significand pair to generate a second sticky bit. The least significant bits under the first and second sticky bits are discarded to thereby reduce a length of the first and second significand pairs.

In another embodiment of the present invention, a floating-point fused dot product unit comprises a first multiplier tree adapted to multiply a first and a second significand of a first and a second operand, respectively, to produce a first significand pair. The floating-point fused dot product unit further comprises a second multiplier tree adapted to multiply a third and a fourth significand of a third and a fourth operand, respectively, to produce a second significand pair. Furthermore, the floating-point fused dot product comprises a far path comprising a first multiplexer configured to select a smaller significand pair of the first and second significand pairs. The far path additionally comprises a second multiplexer configured to select a greater significand pair of the first and second significand pairs. Additionally, the far path comprises a first alignment and sticky unit coupled to the first multiplexer, where the first alignment and sticky unit is configured to align the smaller significand pair and perform sticky logic for the smaller significand pair. Furthermore, the far path comprises a first inverter coupled to the first alignment and sticky unit, where the first inverter is configured to invert the aligned significand pair in response to an operation being a subtraction. In addition, the far path comprises a sticky unit coupled to the second multiplexer, where the sticky unit is configured to perform sticky logic for the greater significand pair. The far path further comprises a first four-to-two carry save adder coupled to the first inverter and the sticky unit, where the first four-to-two carry save adder is configured to receive the inverted aligned significand pair and the greater significand pair to produce a first two significands. The floating-point fused dot product unit comprises a close path comprising a second alignment unit configured to align the first and second significand pairs. The close path further comprises a second inverter coupled to the second alignment unit, where the second inverter is configured to invert the aligned first significand pair. Furthermore, the close path comprises a third inverter coupled to the second alignment unit, where the third inverter is configured to invert the aligned second significand pair. Additionally, the close path comprises a second four-to-two carry save adder coupled to the second inverter and the second alignment unit, where the second four-to-two carry save adder is configured to receive the inverted aligned first significand pair and the aligned second significand pair to produce a second two significands. In addition, the close path comprises a third four-to-two carry save adder coupled to the third inverter and the second alignment unit, where the third four-to-two carry save adder is configured to receive the inverted aligned second significand pair and the aligned first significand pair to produce a third two significands. Furthermore, the close path comprises a comparison unit configured to compare the second two significands and a result of the comparison selects one of the second and third two significands to not be complemented after significand addition. Additionally, the close path comprises a normalization unit configured to normalized the selected one of the second and third two significands.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which:

FIG. 6 is a table showing the pre-encoding patterns that terminate the leading zeros and the corresponding leading zeros for W>0 in accordance with an embodiment of the present invention;

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
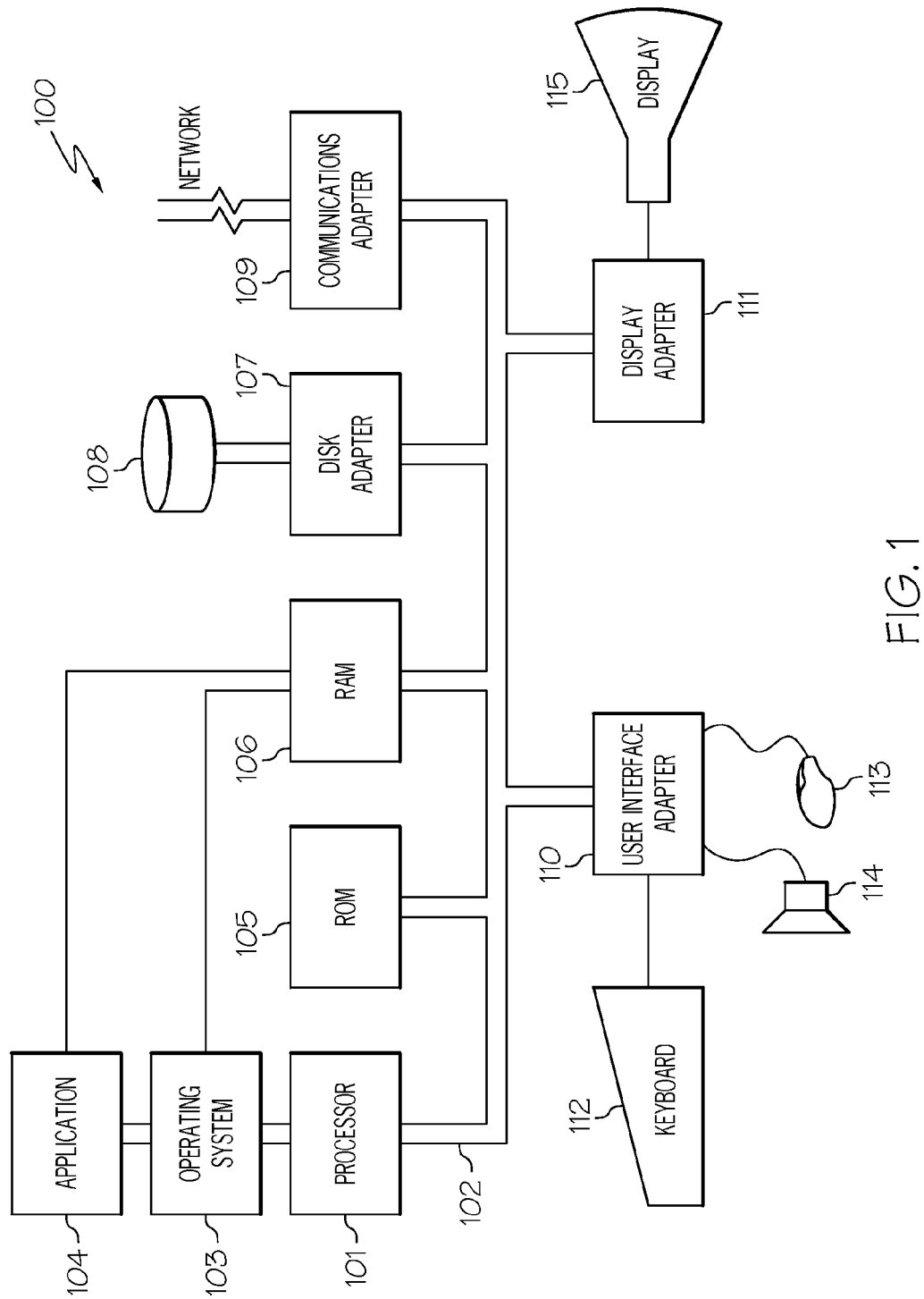
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Computer system 100 has a processor 101 coupled to various other components by system bus 102. A more detailed description of processor 101, specifically, the floating-point fused dot-product unit of processor 101, is described further below in connection with FIGS. 2-12.

FIG. 1 further illustrates an operating system 103 that runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104.

Referring again to FIG. 1, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 and receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

As stated in the Background section, floating-point operations are widely used for advanced applications, such as 3D graphics, signal processing and scientific computations. These computations require a wide dynamic range of values. Fixed-point arithmetic is not sufficient for representing such a wide range of values, but floating-point arithmetic, such as that which is specified in the IEEE-754 standard for floating-point arithmetic, can represent a wide range of numbers from tiny fractional numbers to nearly infinitely huge numbers so that the overflow and underflow are avoided. However, the floating-point operations require complex processes, such as alignment, normalization and rounding, which significantly increase the area, power consumption and latency. One solution is to merge or "fuse" several operations in one floating-point unit to reduce the area, power and latency by sharing the common logic of the operations. In order to improve the floating-point units, several fused units have been introduced: fused multiply-add, fused add-subtract, and fused dot product. Unfortunately, despite these improvements to the floating-point units, such as the fused dot product unit, the current floating-point dot product unit is still expensive in terms of silicon area, power consumption and latency.

The principles of the present invention provide a floating-point fused dot product unit whose area and power consumption is reduced and performance is improved by fusing two multiply and one add operation as well as using a two-path addition algorithm as discussed below in connection with FIGS. 2-12. In particular, the floating-point fused two-term dot product unit takes four normalized operands and computes the sum or difference of the two products as shown in the following equation (EQ 1):

$$P = AB \pm CD \qquad (1)$$

The floating-point fused two-term dot product unit of the present invention supports all five rounding modes specified in the IEEE-754 standard. Several techniques are employed not only to improve the performance but also to reduce the area and power consumption:

(1) For fast alignment, a new alignment scheme is proposed. By swapping the significands and shifting only the smaller significands, the shift amount is reduced so that the area and latency are reduced.

(2) Early normalization is applied, which was proposed to reduce the latency of the fused multiply-add unit. By performing the normalization prior to the addition, the length of the significands can be reduced using the sticky logic, reducing the addition size by half. The sign is also determined prior to the addition so that the addition and rounding can be performed together, which significantly reduces the latency.

(3) Since the normalization is performed prior to the addition, the Leading Zero Anticipation (LZA) and normalization shift are on the critical path. In order to reduce the latency, a four-input LZA is proposed.

(4) The dual-path algorithm is employed to improve the performance. The dual-path logic consists of a far path and a close path. Based on the exponent difference, one of the paths is selected. In the far path logic, massive cancellation does not occur so that LZA and normalization are unnecessary. In the close path logic, only a two bit significand alignment is required so that the large significand shifter is unnecessary. By removing the unnecessary logic in each path, the latency is reduced.

(5) In order to increase the throughput, pipelining can be applied. Based on the data flow analysis, the proposed dual-path floating-point fused dot product unit is split into three stages. Since the latencies of the three stages are relatively well balanced, the throughput is improved.

The floating-point dot product unit can be simply implemented by using two floating-point multipliers and a floating-point adder. However, such a discrete version requires large area, power consumption and latency. Moreover, since rounding is performed three times (after each of the multiplications and after the addition), the accuracy is decreased. In order to reduce the area and latency, and increase the accuracy, the floating-point fused dot product unit is introduced as shown in FIG. 2.

Figure 2:
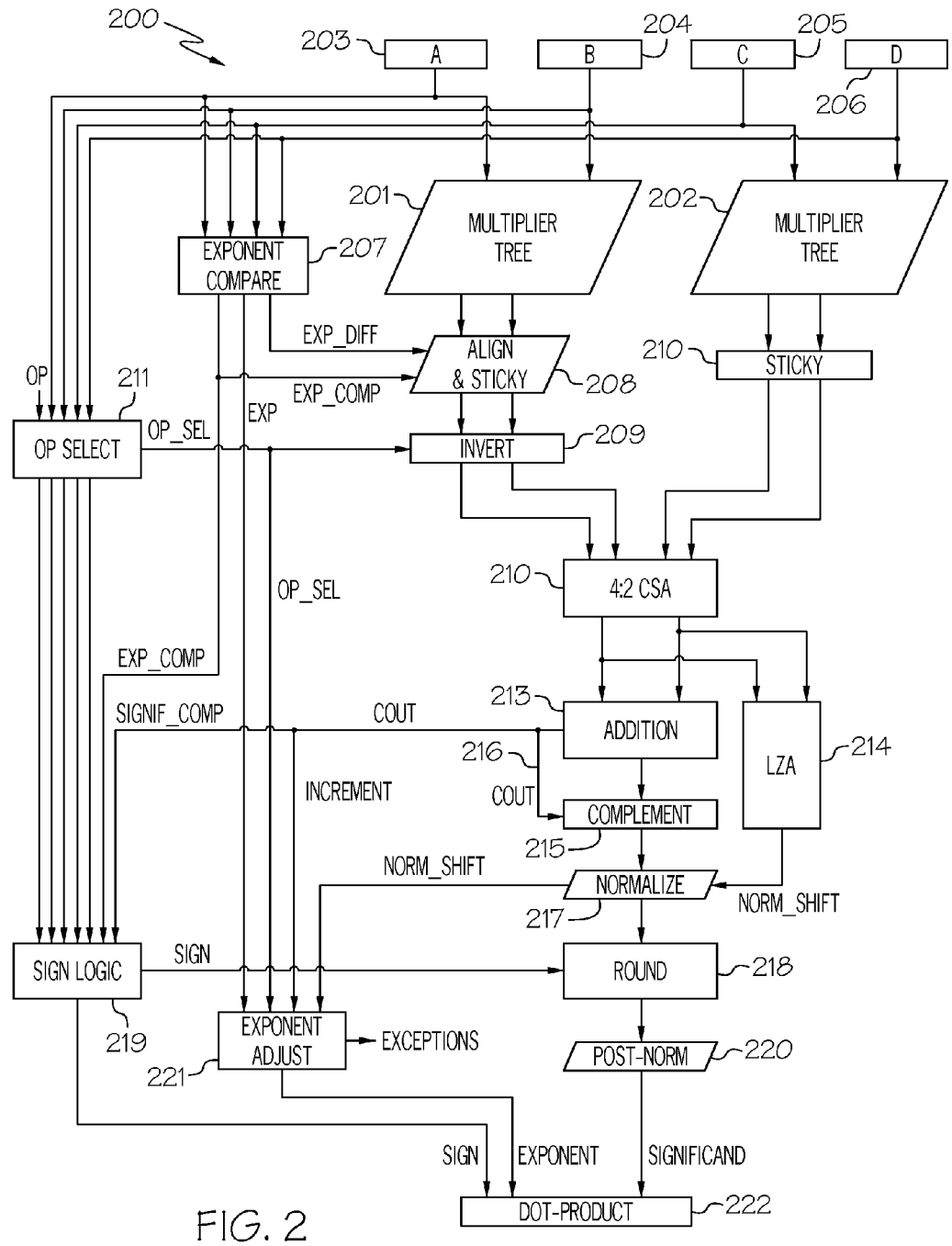
FIG. 2 illustrates a traditional floating-point fused dot product unit.

FIG. 2 illustrates a traditional floating-point fused dot product unit 200. Referring to FIG. 2, floating-point fused dot-product unit 200 includes a first multiplier tree 201 and a second multiplier tree 202. First multiplier tree 201 includes a first input 203 and a second input 204 to receive first and second operands (A and B). Second multiplier tree 202 includes a third input 205 and a fourth input 206 to receive third and fourth operands (C and D). In a particular embodiment, the first, second, third, and fourth floating-point numbers (A, B, C, and D) are 32-bit floating-point numbers. The first and second multiplier trees 201, 202 are configured to each generate significand pairs related to operands A and B, and C and D, respectively.

Floating-point fused dot-product unit 200 further includes an exponent compare unit 207 that is coupled to the first, second, third, and fourth inputs 203, 204, 205, 206 to compare the exponents of the operands and to produce an exponent different signal (identified as "exp_diff" in FIG. 2) and an exponent compare signal (identified as "exp_comp" in FIG. 2) to align and sticky component 208, which is coupled to the first multiplier tree 201 to receive a significand pair produced by multiplier tree 201. Align and sticky component 208 is adapted to selectively shift/align the significand pair according to the exponent different signal and the exponent compare signal as well as to perform the sticky logic for the received significand pair (i.e., produce a sticky bit). The aligned significand pair is inputted to an invert block 209 that provides the inverted aligned significand pair to a four-to-two (4:2) carry save adder (CSA) component 210, where the operation of invert block 209 is selected by a signal (identified as "op_sel" in FIG. 2) outputted by op select component 211 that receives the first, second, third, and fourth inputs 203, 204, 205, 206 to select one of the four operands.

As stated above, second multiplier tree 202 is adapted to produce a significand pair related to the third and fourth floating-point numbers (C and D) and to provide the significand pair to sticky component 212 to perform the sticky logic for the significand pair which is then inputted to 4:2 CSA component 210.

4:2 CSA component 210 receives the inverted aligned significand pair from invert 209 and the non-inverted significand pair from sticky component 212 and generates two terms (two significands), which are provided to an adder 213 and to a Leading Zero Anticipator (LZA) 214. Adder 213 produces a sum of the outputs of 4:2 CSA component 210 and provides the sum to a complement module 215. Complement module 215 receives the sum from adder 213 and an indicator 216 (identified as "cout" in FIG. 2) from adder 213 regarding whether or not to complement the sum. Complement module 215 selectively complements the sum, based on indicator 216 from adder 213, and provides an output to normalize module 217. LZA 214 determines a likely number of leading zeros in the final dot-product based on the values from the 4:2 CSA 210, and provides a signal (identified as "norm_shift" in FIG. 2) to normalize unit 217 indicative of predicted leading zero information.

Normalize module 217 applies a normalization operation to the output. Normalize module 217 provides the normalized output to a round module 218. Round module 218 rounds the output based on a signal (identified as "sign" in FIG. 2) received from sign logic 219 to produce a result inputted to post-norm module 220. Sign logic 219 generates the sign signal based on the following inputs: outputs of op select 211, the exponent compare signal and the significant compare signal (identified as "signif_compar" in FIG. 2 corresponding to the "cout" signal). The post-norm module 220 generates the significand of the floating-point number.

Furthermore, floating-point fused dot product unit 200 generates the exponent of the floating-point number from the output of exponent adjust module 221, which receives the exponent output (identified as "exp" in FIG. 2) of exponent compare unit 207, the operation select output (identified as "op_sel" in FIG. 2), the output of adder 213 (identified as "increment" in FIG. 2) and the output of LZA 214 (identified as "norm shift" in FIG. 2). Exponent adjust module 221 further outputs exceptions.

Additionally, as stated above, sign logic 219 generates a sign. The sign generated by sign logic 219, together with the exponent generated by exponent adjust module 221 and the significand generated by post-norm module 220 produce a dot-product result 222.

As illustrated in FIG. 2, floating-point fused dot product unit 200 shares the common logic, such as exponent compare, significand addition, exponent adjust and sign logic so that the area, power consumption and latency are reduced. Also, floating-point fused dot product unit 200 performs only a single rounding so that the accuracy increases.

The traditional floating-point fused dot product unit 200 is based on the floating-point fused multiply-add unit as shown in FIG. 2. The steps to execute the floating-point fused dot product are as follows:

(1) Four floating-point numbers are unpacked into their signs, exponents and significands.

(2) Two multiplier trees 201, 202 are used to produce two pairs of sums and carries (a total of four numbers). In parallel, two sums of exponents are computed and compared to determine the greater product and the difference is computed. Also, the operation (addition or subtraction) is selected using the sign bits and op code.

(3) One sum and carry pair is aligned by align and sticky component 208 based on the exponent difference result and inverted by invert 209 if the operation is subtraction. The two pairs of significands are passed to 4:2 reduction tree 210. Carry save adders are used to form the reduction tree, which reduces the four significands to two.

(4) The two significands are summed and complemented by adder 213 and complement module 215 if the sum is negative. LZA 214 is performed for fast normalization. The significand comparison result is passed to sign logic 219 so that the sign is determined.

(5) Since some of the rounding modes specified in the IEEE-754 standard require the sign (i.e., round to positive and negative infinity), sign logic 219 must be performed prior to round logic 218.

(6) The normalized significands are rounded by round module 217 and post-normalized by post-norm module 220. The exponent is adjusted by exponent adjust module 221 with the addition carry out and the normalization shift amount.

The traditional floating-point fused dot product unit 200 reduces the area, latency and power consumption compared to the discrete floating-point dot product unit. However, it is an initial design so that more optimizations can be applied to improve the performance as discussed below. Specifically, several optimizations are proposed to improve the floating-point fused dot product unit 200: 1) a new alignment scheme, 2) early normalization and fast rounding, and 3) a four-input LZA. Such an enhanced floating-point fused dot product unit 300 is shown in FIG. 3.

Figure 3:
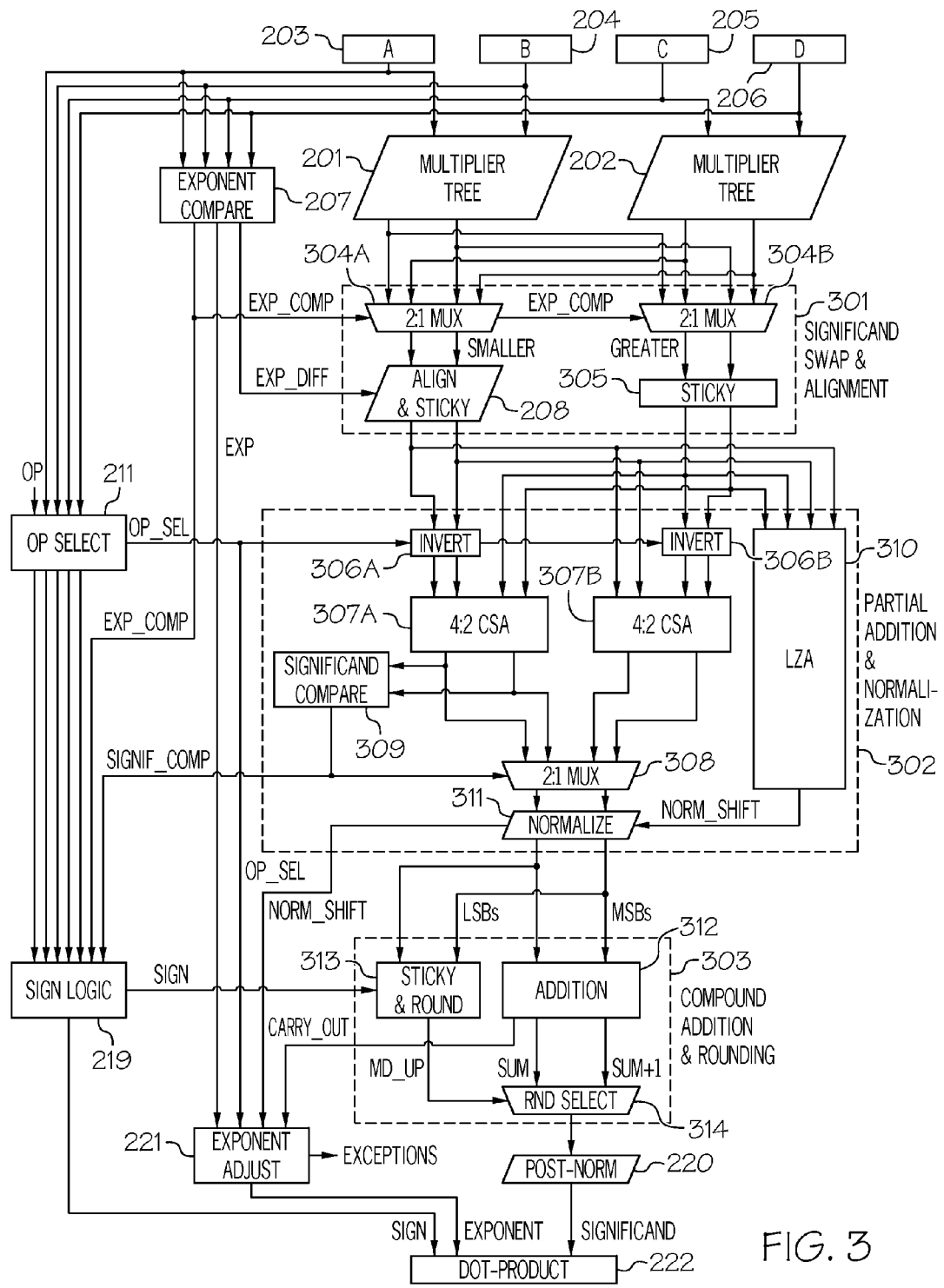
FIG. 3 illustrates an enhanced floating-point fused dot product unit in accordance with an embodiment of the present invention.

FIG. 3 illustrates an enhanced floating-point fused dot product unit 300 in accordance with an embodiment of the present invention. Similar components used in the enhanced floating-point fused dot product unit 300 that were also used in the traditional floating-point fused dot product unit 200 have the same reference numerals for ease of understanding.

Referring to FIG. 3, in comparison to FIG. 2, enhanced floating-point fused dot product unit 300 includes a significand swap and alignment section 301, a partial addition and normalization section 302 as well as a compound addition and rounding section 303 which differ from traditional floating-point fused dot product unit 200.

Significand swap and alignment section 301 includes two 2:1 multiplexers 304A-304B receiving the two significand pairs (pairs of the sum and carry bits) from multiplier trees 201, 202. The output of multiplexers 304A-304B is selected based on the exp_comp signal generated from exponent compare unit 207. Multiplexer 304A outputs the smaller significand pair of the two significand pairs generated by multiplier trees 201, 202, whereas, multiplexer 304B outputs the greater significand pair of the two significand pairs generated by multiplier trees 201, 202.

The smaller significand pair selected by multiplexer 304A is inputted to align and sticky component 208, which receives the exponent different signal from exponent compare unit 207, to align the smaller significand pair as well as to perform sticky logic for the smaller significand pair. The greater significand pair selected by multiplexer 304B is inputted to sticky unit 305 to perform the sticky logic for the greater significand pair.

Partial addition and normalization section 302 includes invert block 306A, 306B. Invert block 306A receives the output (aligned smaller significand pair) of align and sticky component 208; whereas, invert block 306B receives the output (greater significand pair) of sticky unit 305.

Partial addition and normalization section 302 further includes two four-to-two (4:2) carry save adder (CSA) components 307A, 307B. 4:2 CSA component 307A receives the inverted aligned significand pair and the greater significand pair to produce two significands. Furthermore, CSA component 307B receives the inverted greater significand pair and the aligned significand pair to produce two significands. The two significand pairs produced by 4:2 CSA components 307A, 307B are inputted to a 2:1 multiplexer 308, which selects one of these significand pairs based on the "signif_comp" signal outputted from a significand compare unit 309. Significand compare unit 309 receives as its inputs, the significand pair produced by 4:2 CSA component 307A.

Furthermore, partial addition and normalization section 302 includes a Leading Zero Anticipator (LZA) 310 which receives the aligned smaller significand pair and the greater significand pair from align and sticky component 208 and sticky unit 305. Leading Zero Anticipator (LZA) 310 obtains a count of the leading zeros which is a shift amount of a normalization (identified as "norm_shift" in FIG. 3), which is inputted to normalize unit 311.

Compound addition and rounding section 303 includes an adder 312 coupled to normalize unit 311, where adder 312 is configured to add the most significant bits of the normalized significands. Furthermore, compound addition and rounding section 303 includes a sticky and round module 313 coupled to normalize unit 311, where sticky and round module 313 is configured to generate round, guard and sticky bits using the least significant bits of the normalized significands. Adder 312 outputs the sum and sum+1 bits to the round select unit 314 (identified as "Rnd Select" in FIG. 3), whose output is selected from the output of sticky and round module 313 (identified as "md_up") which is provided to post-norm module 220. Adder 312 further outputs the carry-out bit to exponent adjust module 221.

The operation of the significand swap and alignment section 301, the partial addition and normalization section 302 as well as the operation of the compound addition and rounding section 303 will now be discussed below.

Figure 4A:
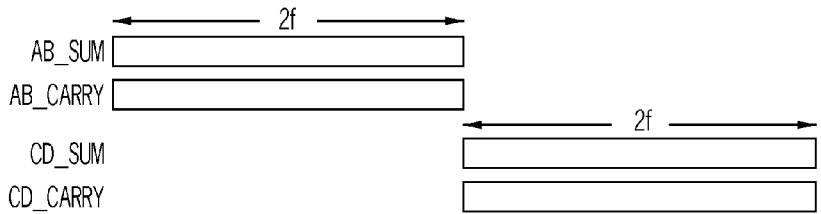
FIG. 4A illustrates the traditional floating-point fused dot product unit performing the significand alignment on a single side significand pair.
Figure 4A:
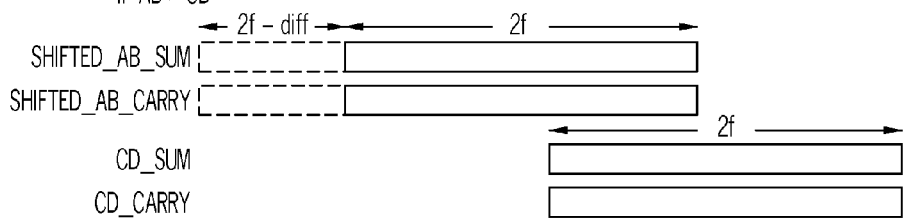
Figure 4A:
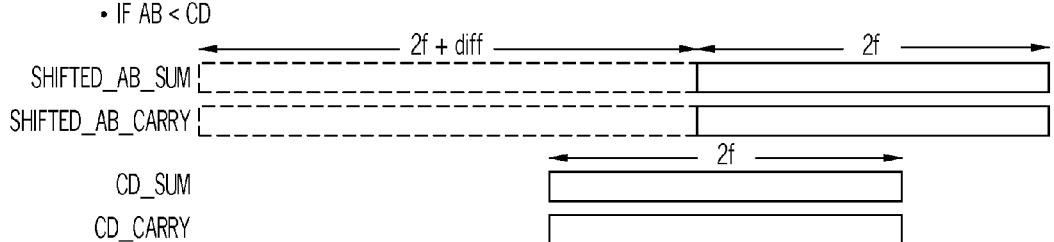
Figure 4A:
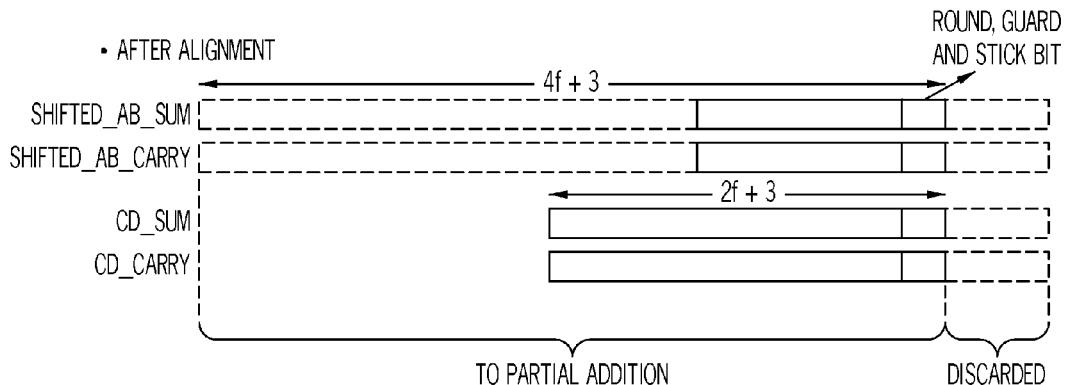
Figure 4B:
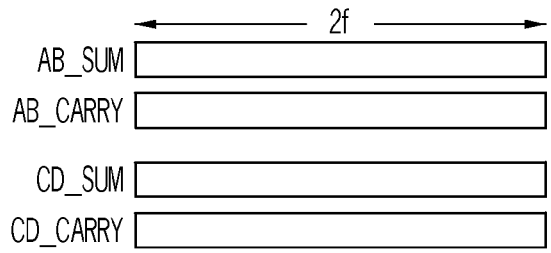
FIG. 4B illustrates the alignment method of the enhanced floating-point fused dot product unit of FIG. 3 swapping the significands to shift the smaller significand pair so that the shift amount is reduced in accordance with an embodiment of the present invention.
Figure 4B:
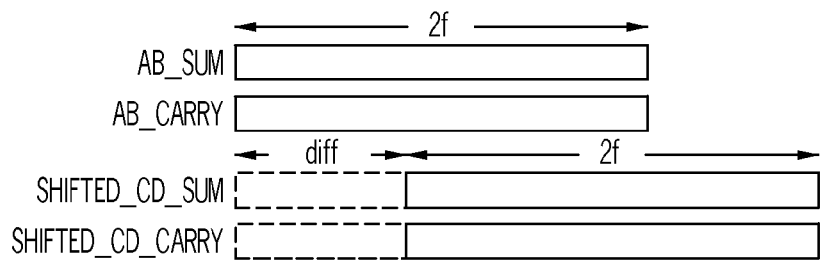
Figure 4B:
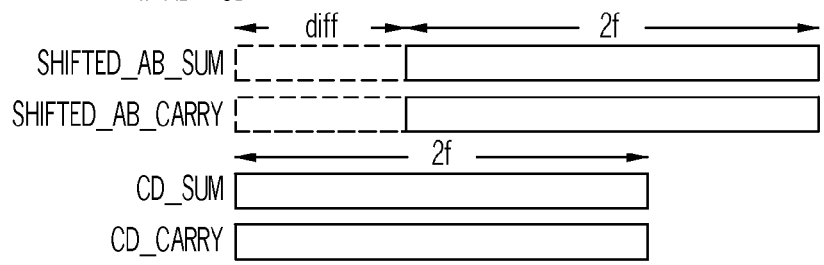
Figure 4B:
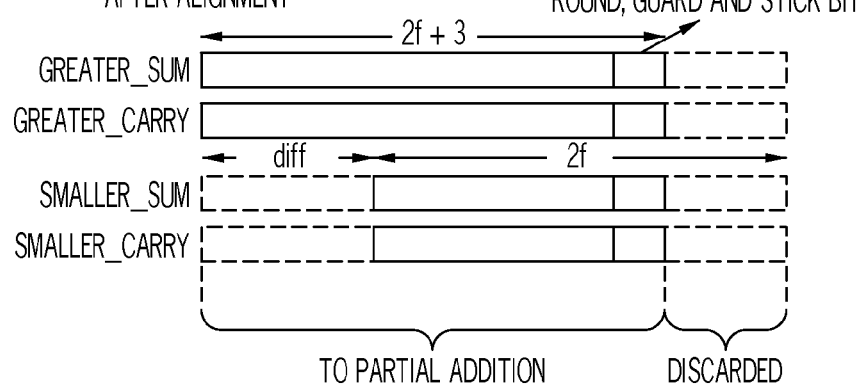

As discussed above, one of the optimizations to improve the floating-point fused dot product unit 200 (FIG. 2) is a new alignment scheme. The traditional floating-point fused dot product unit 200 performs the significand alignment on a single side significand pair (sum and carry) as shown in FIG. 4A. The one way alignment requires a large shift amount, which increases the latency of the critical path. In order to reduce the latency of the alignment, the new alignment method of enhanced floating-point fused dot product unit 300 (FIG. 3) swaps the significands to shift the smaller significand pair (align and sticky component 208) so that the shift amount is reduced as shown in FIG. 4B in accordance with an embodiment of the present invention. Also, the sticky logic (align and sticky component 208, sticky unit 305) is performed to generate the round, guard and sticky bits. If the exponent difference is larger than 2, massive cancellation does not occur so that the discarded bits are not affected by the normalization. If the exponent difference is 2 or less, the shifted bits are maintained by the round, guard and sticky bits. For larger shifts, the LSBs under the sticky bit can be discarded so that the length of the significand pairs is reduced. Due to the reduced shift amount and sticky logic, smaller significand pairs are generated compared to the traditional alignment, resulting in reduced area and power consumption for the following logic.

Referring again to FIG. 3, in conjunction with FIG. 2, as also discussed above, another optimization to improve the floating-point fused dot product unit 200 is through early normalization and fast rounding. If the operation is subtraction, the significand pairs are inverted by inverters 306A, 306B. The inverted and non-inverted significand pairs are passed to each reduction tree (4:2 CSA components 307A, 307B) and reduced to two significands. The two significands are compared by significand compare unit 309 and the comparison result ("signif_comp") selects the one that is not to be complemented after the significand addition. Also, the significand comparison result is used in sign logic 219.

Figure 5:
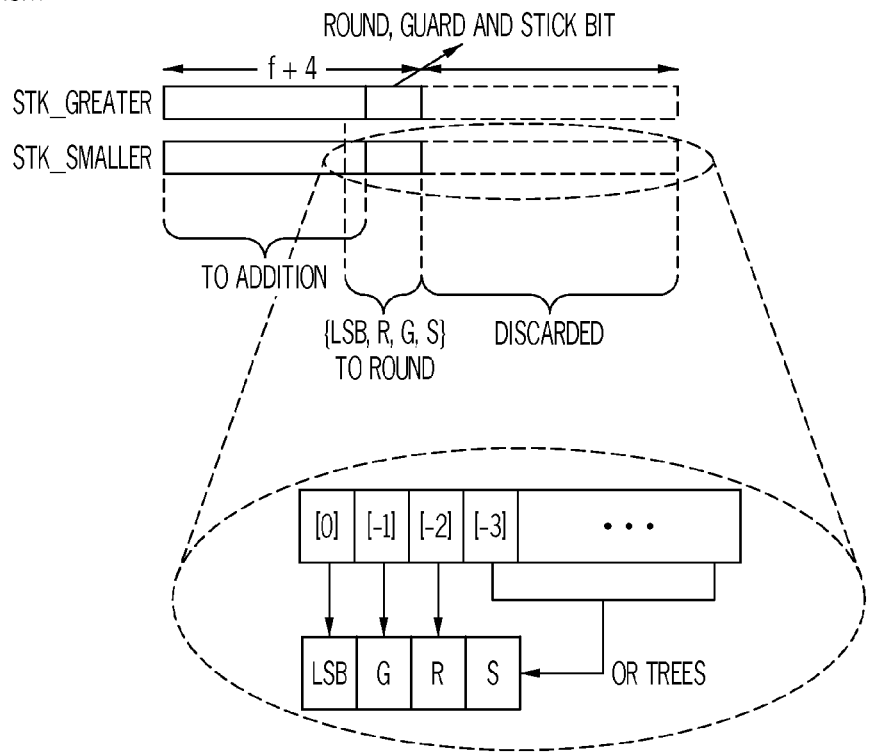
FIG. 5 illustrates the early normalization and sticky logic in accordance with an embodiment of the present invention.

The reduced significand pair is passed to normalization unit 311. The traditional floating-point fused dot product unit 200 performs the normalization after the significand addition, which requires a large adder and compliment followed by the round logic. For fast significand addition and rounding, early normalization is applied. By normalizing the significands prior to the significand addition, the length of the adder can be reduced up to the length of the final significand and the round logic can be performed in parallel. FIG. 5 shows the early normalization and sticky logic in accordance with an embodiment of the present invention.

Referring to FIG. 5, in conjunction with FIGS. 2-3, the MSBs of the normalized significands are passed to adder 312 and the LSBs are passed to sticky and round logic 313. The sticky logic is performed again to generate round, guard and sticky bits. The $1^{st}$ and $2^{nd}$ bits under the LSB become the guard and round bits and the sticky bit is set if at least one bit of the rest of the LSBs is 1, which can be implemented with OR trees. The four bits including the LSB, guard, round and sticky bits are used for the round logic to simplify the round logic and the rest of the LSBs are discarded.

Since some of the round modes specified in the IEEE-754 standard require knowing the sign (i.e., round to positive and negative infinity), sign logic 219 must be performed prior to the round logic. The significand comparison result (signif_comp) from the partial addition is used for sign logic 219, if the exponent difference is zero. The sign bit is passed to the final result as well as to round module 313. For fast rounding, compound addition is used, which produces the rounded and unrounded sums together and round logic 314 selects the correct result. By performing the significand addition and rounding together, the latency is significantly reduced.

As further discussed above, another optimization to improve the floating-point fused dot product unit 200 is by having a four-input LZA 310 in the partial addition and normalization section 302.

Since the normalization is performed prior to the significand addition, LZA 310 and normalization is placed on the critical path. To use the traditional two-input LZA 214 for the floating-point fused dot product unit 200, a 4:2 reduction tree is required prior to LZA 214. The four-input LZA 310 of enhanced floating-point fused dot product unit 300, however, reduces the overhead of the reduction tree by encoding the four inputs at once.

Four-input LZA 310 can be implemented by extending the traditional two-input LZA 214. In order to encode four inputs, the W vector is generated with bitwise operations as shown in Equation (EQ 2):

$$W = A + B - C - D \quad w_i = a_i + b_i - c_i - d_i, w_i E(-2, -1, 0, 1, 2), \quad (2)$$

where $a_i$, $b_i$, $c_i$, $d_i$ are the $i^{th}$ bits of the four significands. The W vector can be represented by one of the five elements, $\bar{2}_i$, $\bar{1}_i$, $0_i$, $1_i$ and $2_i$ indicating $w_i$ equals to $-2, -1, 0, 1$ and $2$, respectively. The W vector is pre-encoded into three symbols, g, e and s as shown in Equation (EQ 3):

$$g_i = 1 \text{ if } w_i = 1$$

$$e_i = 1 \text{ if } w_i = 0$$

$$s_i = 1 \text{ if } w_i = \bar{1} \quad (3)$$

To handle the cases of $-2$ and $2$, two consecutive bits are involved for pre-encoding. For example, the bit pattern $0_i 2_{i+1}$ and are considered as $1_i \bar{2}_{i+1}$ are considered as $1_i 0_{i+1}$ and $0_i 0_{i+1}$, respectively. Thus, the three symbols are represented as shown in Equation (EQ 4):

$$g_i = 2_i(2_{i+1} = \bar{2}_{i+1}) + 1_i(1_{i+1} + 0_{i+1} + \bar{1}_{i+1}) + 0_i 2_{i+1}$$

$$e_i = 2_i(1_{i+1} + 0_{i+1} + \bar{1}_{i+1}) + 1_i(2_{i+1} + \bar{2}_{i+1}) + 0_i(1_{i+1} + 0_{i+1} + \bar{1}_{i+1}) + \bar{1}_i(2_{i+1} + \bar{2}_{i+1}) + \bar{2}_i(1_{i+1} + 0_{i+1} + \bar{1}_{i+1})$$

$$s_i = 0_i \bar{2}_{i+1} + \bar{1}_i(1_{i+1} + 0_{i+1} + \bar{1}_{i+1}) + \bar{2}_i(2_{i+1} + \bar{2}_{i+1}) \quad (4)$$

The pre-encoding patterns that terminate the leading zeros and the corresponding leading zeros for W>0 are shown in the table of FIG. 6 in accordance with an embodiment of the present invention. Referring to FIG. 6, in conjunction with FIGS. 2-3, the number of leading zeros is computed with the three symbols as shown in Equation (EQ 5):

$$f_i(\text{pos}) = e_{i-1} g_i \bar{s}_{i+1} + \bar{e}_{i-1} s_i \bar{s}_{i+1} \text{ for } W > 0. \quad (5)$$

Similarly, for the bit patterns when W<0, $$f_i(\text{neg}) = e_{i-1} s_i \bar{g}_{i+1} + \bar{e}_{i-1} g_i \bar{g}_{i+1} \text{ for } W < 0. \quad (6)$$

Combining two equations, the F vector is generated as $$f_i = s_{i-1}(g_i \bar{s}_{i+1} + s_i \bar{g}_{i+1}) + \bar{e}_{i-1}(s_i \bar{s}_{i+1} + g_i \bar{g}_{i+1}). \quad (7)$$

This is essentially the same equation as that of the traditional two-input LZA 214. The F vector is encoded with the Leading Zero Detector (LZD) to obtain the number of leading zeros, which is the shift amount of the normalization. For fast normalization, the MSBs of the shift amount are generated so that the LZD tree and the normalization shifter are overlapped.

Like most of the two-input LZAs that are inexact due to a possible 1 bit error, the proposed four-input LZA 310 also requires correction logic. For fast error detection and correction, concurrent error correction logic can be used. In the cases of the bit patterns[1] $0^k 10^i \bar{1}$ and $0^k 1 \bar{1} 0^i \bar{1}$ for W>0 and $0^k \bar{1} 0^i 1$ and $0^k \bar{1} 1 0^i 1$ for W<0, correction is performed by adding 1.

[1] The notation $x^k$ denotes a bit string of k consecutive bits, where $x \in (\bar{1}, 0, 1)$ and $k \geq 0$.

Figure 7:
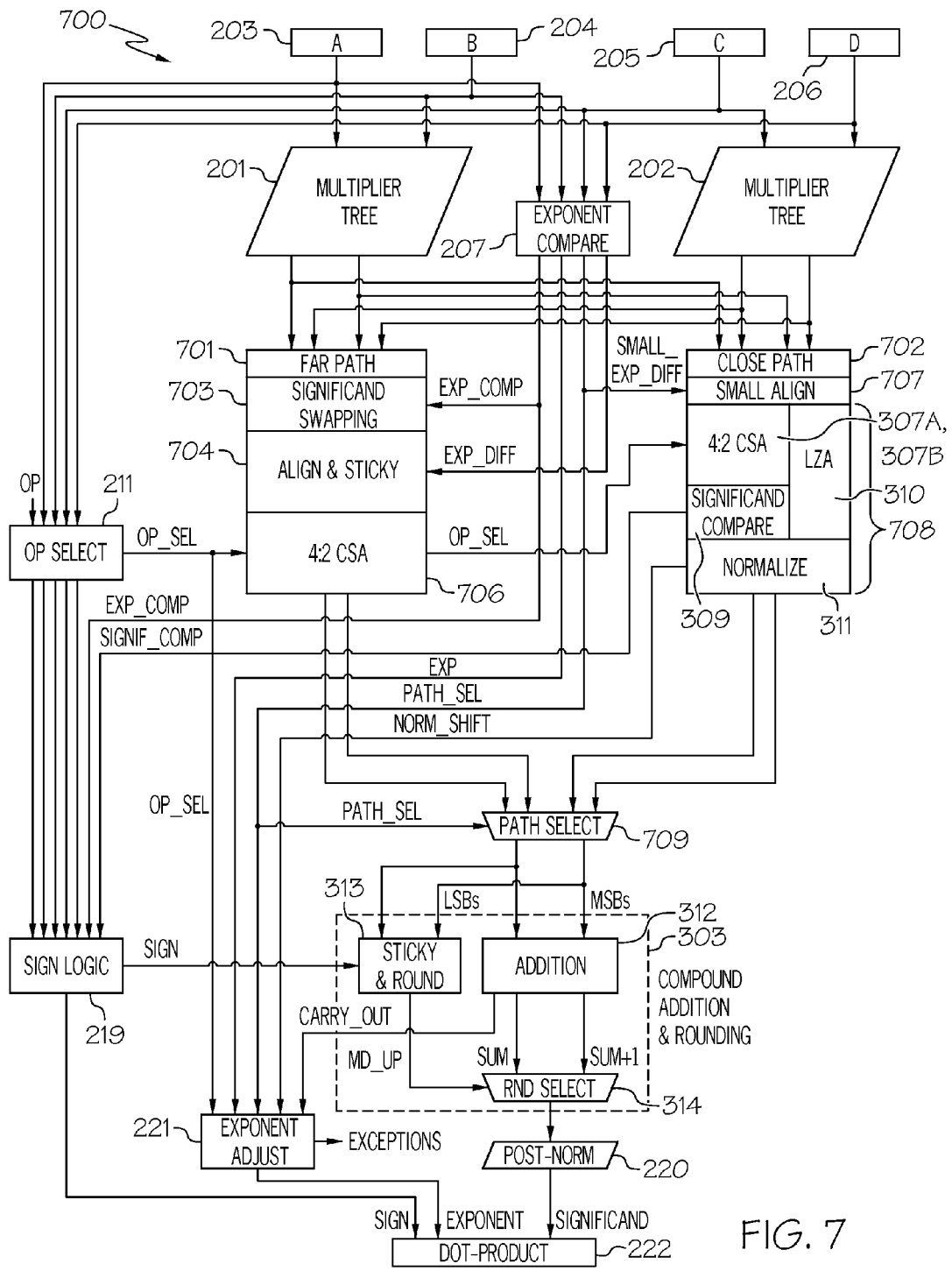
FIG. 7 illustrates a dual-path floating-point fused dot product unit consisting of a far path and a close path in accordance with an embodiment of the present invention.

In order to achieve a high speed floating-point fused dot product unit, the dual-path approach is employed as discussed below. The dual-path floating-point fused dot product unit 700 consists of a far path and a close path as shown in FIG. 7 in accordance with an embodiment of the present invention. Referring to FIG. 7, in comparison to FIG. 3, dual-path floating-point fused dot product unit 700 includes a far path 701 and a close path 702, where far path 701 includes the following operations: significand swapping 703, align and sticky 704 and invert and reduction tree 705 (shown in FIG. 8)

performed by a 4:2 CSA 706 as discussed in further detail below in connection with FIG. 8. Furthermore, close path 702 includes the following operations: significand alignment 707 and a reduction tree and normalization 708 as discussed in further detail below in connection with FIG. 9.

The outputs of far path 701 and close path 702 are inputted to a path select module 709 which selects the path (far path or close path) based on a signal (identified as "path_set" in FIG. 7) from exponent compare unit 207. The path_set signal is further inputted to exponent adjust module 221. Adder 312 is coupled to path select module 709 and adds the most significant bits of either the normalized significands (produced by normalize unit 311) or the significands produced by 4:2 CSA 706. Furthermore, sticky and round module 313 is coupled to path select module 709 and generates the round, ground and sticky bits using the least significant bits of either the normalized significands (produced by normalize unit 311) or the significands produced by 4:2 CSA 706.

As illustrated in FIG. 7, the path is determined based on the exponent difference (exp_diff). Far path 701 skips the LZA and normalization and close path 702 skips the significand swap and alignment. Since these two processes are the bottlenecks of the traditional floating-point fused dot product unit, the two path process improves the performance.

A description of the far path logic 701 will now be discussed in connection with FIG. 8. FIG. 8 illustrates far path logic 701 for dual-path floating-point fused dot product unit 700 in accordance with an embodiment of the present invention.

Figure 8:
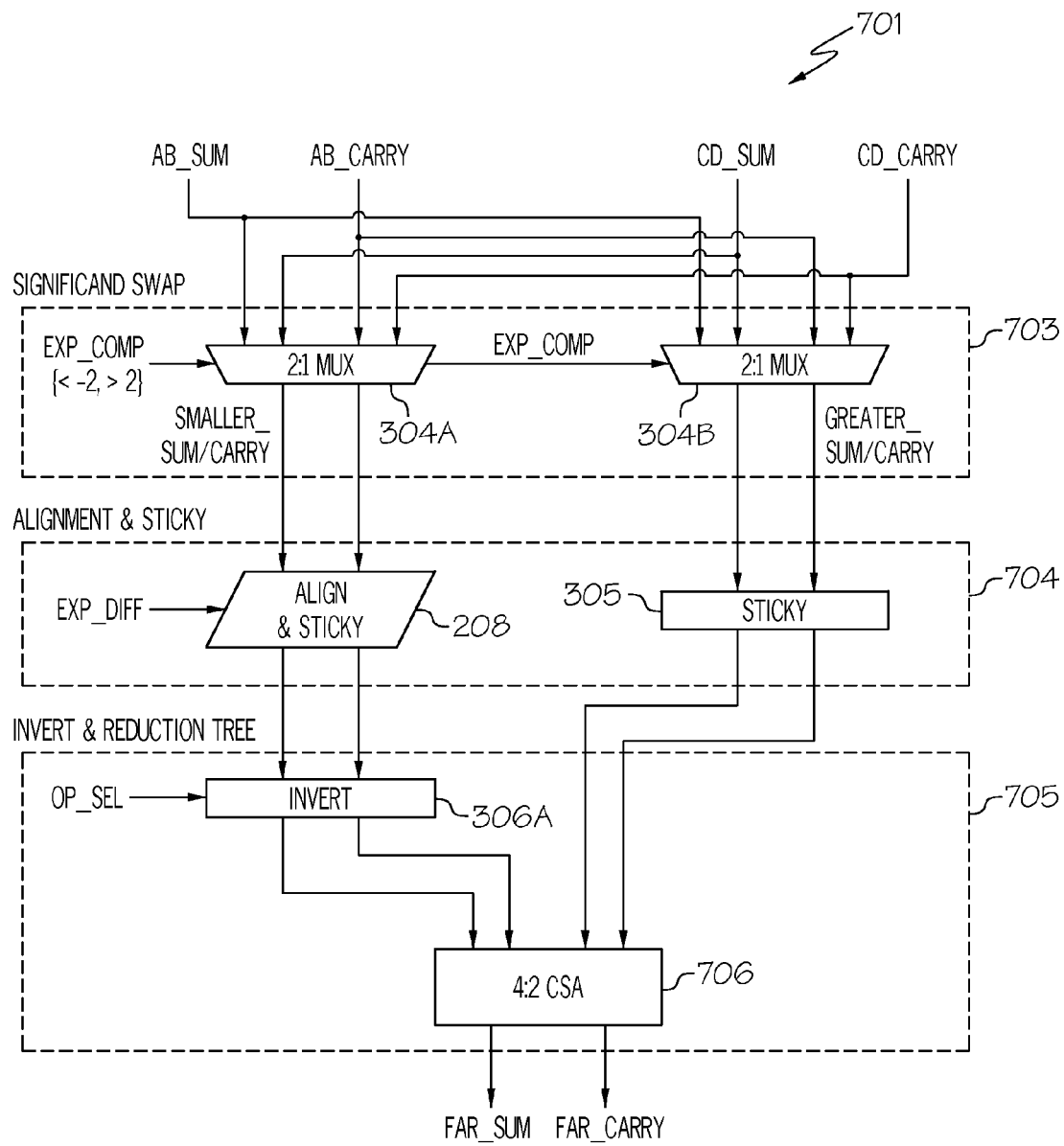
FIG. 8 illustrates the far path logic for the dual-path floating-point fused dot product unit of FIG. 7 in accordance with an embodiment of the present invention.

Referring to FIG. 8, in conjunction with FIG. 7, far path logic 701 for the dual-path floating-point fused dot product unit 700 can be implemented as the significand swap and alignment part 301 of the enhanced floating-point fused dot product unit 300 as shown in FIG. 8. Far path 701 is selected if the exponent difference is larger than 2 or the operation is addition. Since the addition of four significands generates a carry out of up to 3, the exponent difference margin for far path 701 is two bits, which is 1 bit larger than that of the general dual-path floating-point adder. In this case, massive cancellation during the subtraction does not occur so that the LZA and normalization are unnecessary. Two multiplexers 304A, 304B are used to swap the significand pairs so that only the smaller significand pair is aligned, which reduces the shift amount. The aligned significand pair is inverted by invert 306A if the operation is subtraction. The sticky logic is performed by align and sticky component 208 and sticky unit 305 for both significand pairs to reduce the significand length. The significand pair for far path 701 is generated by the reduction tree (4:2 CSA 706), which reduces the four significands to two.

Figure 9:
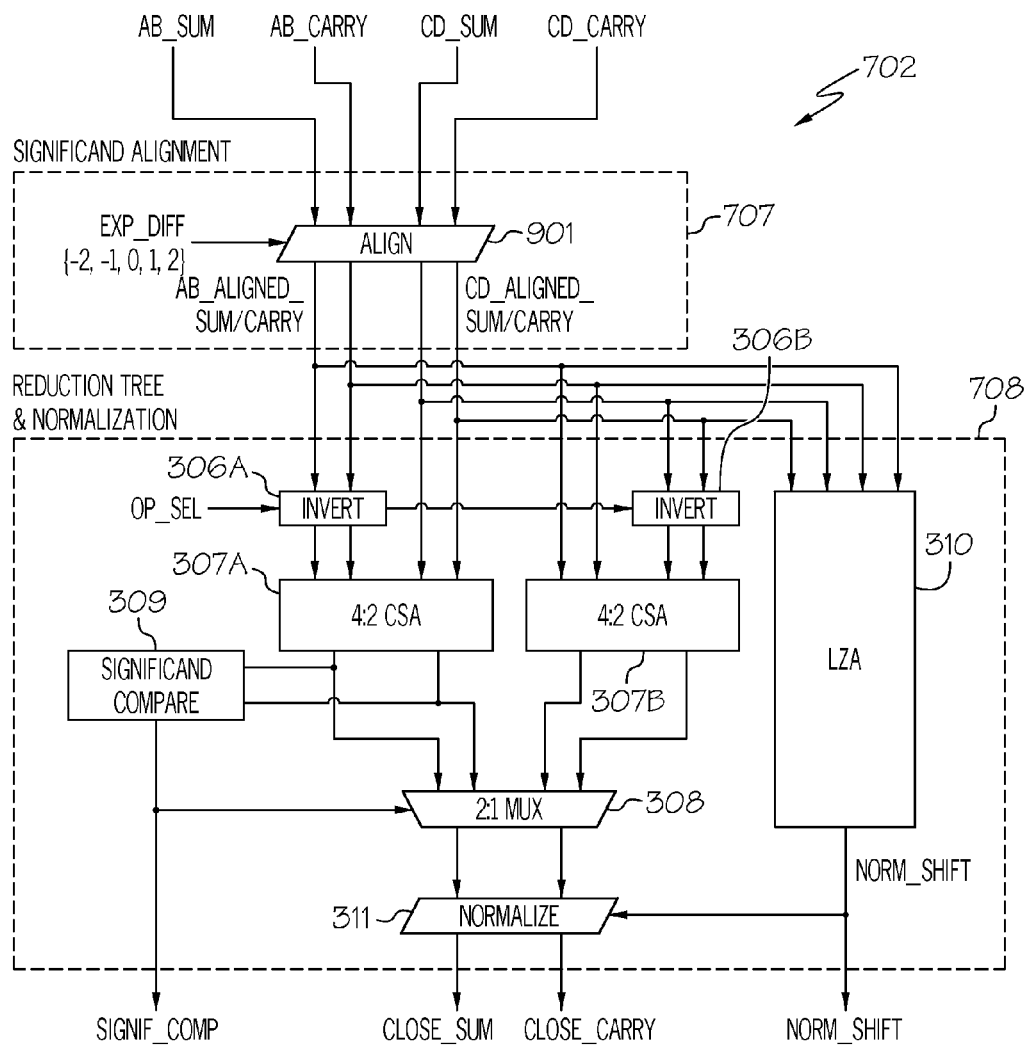
FIG. 9 illustrates the close path logic for the dual-path floating-point fused dot product unit of FIG. 7 in accordance with an embodiment of the present invention.

A description of close path logic 702 will now be discussed in connection with FIG. 9. FIG. 9 illustrates close path logic 702 for the dual-path floating-point fused dot product unit 700 in accordance with an embodiment of the present invention.

Referring to FIG. 9, in conjunction with FIG. 7, close path 702 is selected if the exponent difference is less than 3 and the operation is subtraction. In this case, only a two bit shifter is required for the significand alignment. The significand pairs are aligned by align unit 901 as $$AB_{aligned} = \begin{cases} (AB_{signif}, 00) & \text{if } AB_{exp} - CD_{exp} = 0, 1, 2 \\ (0, AB_{signif}, 0) & \text{if } AB_{exp} - CD_{exp} = -1 \\ (00, AB_{signif}) & \text{if } AB_{exp} - CD_{exp} = -2 \end{cases} \quad (8)$$

$$CD_{aligned} = \begin{cases} (CD_{signif}, 00) & \text{if } AB_{exp} - CD_{exp} = 2 \\ (0, CD_{signif}, 0) & \text{if } AB_{exp} - CD_{exp} = 1 \\ (00, CD_{signif}) & \text{if } AB_{exp} - CD_{exp} = 0, -1, -2. \end{cases} \quad (9)$$

The rest of the close path logic can be implemented as the partial addition and normalization part 302 of the enhanced floating-point fused dot product unit 300 (FIG. 3) as shown in FIG. 9.

Referring to FIGS. 7-9, among the two significand pairs from far path 701 and close path 702, a significand pair is selected based on the exponent difference and the operation. The selected significand pair is passed to the significand addition and round logic. The significand addition and round logic can be implemented similar to that of the enhanced floating-point fused dot product unit 300 which was previously discussed. The following discusses the rest of the sublogic for the floating-point dual-path fused dot product unit 700.

The operation select logic generates the op_sel bit, which determines if the significands are inverted for the significand subtraction. Using the four sign bits of the operands and the input operator, the operation is selected as $$\text{op\_sel} = \begin{cases} AB_{sign} \oplus CD_{sign} & \text{if } op = \text{add} \\ \overline{AB_{sign} \oplus CD_{sign}} & \text{if } op = \text{sub,} \end{cases} \quad (10)$$

where $AB_{sign}$ is $A_{sign} \oplus B_{sign}$ and $CD_{sign}$ is $C_{sign} \oplus D_{sign}$.

Figure 10:
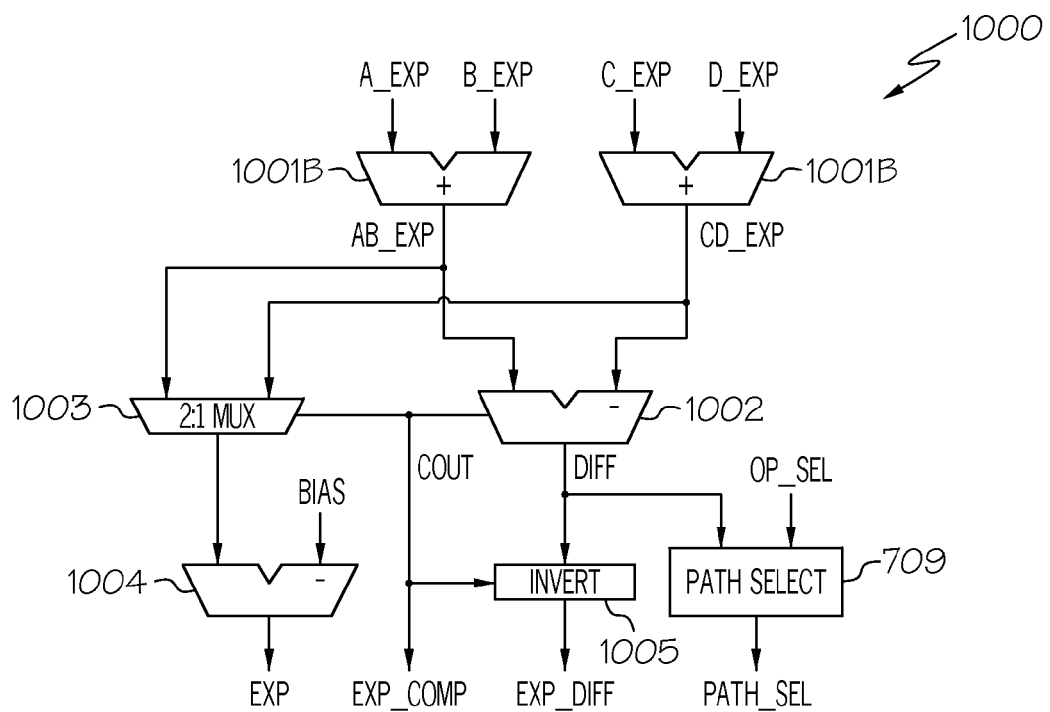
FIG. 10 illustrates the exponent compare and path select logic in accordance with an embodiment of the present invention.

The exponent compare and path select logic 1000 (combination of exponent compare 207 and path select logic 709) is shown in FIG. 10 in accordance with an embodiment of the present invention. Referring to FIG. 10, in conjunction with FIGS. 7-9, the exponent compare and path select logic 1000 include adder 1001A configured to receive as inputs the first and second exponents (A and B) corresponding to the first and second operands A 203 and B 204, respectively. Furthermore, the exponent compare and path select logic 1000 includes adder 1001B configured to receive as inputs the third and fourth exponents (C and D) corresponding to the third and fourth operands C 205 and D 206, respectively. The sums (identified as "AB_exp" and "CD_exp" in FIG. 10) provided by adders 1001A, 1001B, respectively, are provided to subtractor 1002. The output of subtractor 1002 (difference between the sums provided by adders 1001A, 1001B) is outputted to a 2:1 multiplexer 1003 to be used as its selector. Multiplexer 1003 receives the sums provided by adders 1001A, 1001B and selects one of the sums based on the output of subtractor 1002 which is inputted to subtractor 1004, which outputs the difference (identified as "exp" in FIG. 10) between a bias input and the output of multiplexer 1003. Furthermore, the output of subtractor 1002 is the "cout" signal becoming the "exp_comp" signal. Additionally, the difference output (identified as "diff" in FIG. 10) from subtractor 1002 is inputted to invert block 1005 which outputs the exponent different signal (identified as "exp_diff" in FIG. 10) using the "cout" signal. The exponent compare and path select logic 1000 further includes path select 709 receiving the difference output from subtractor 1002 as well as the "op_sel" signal to generate a signal (identified as "path_sel" in FIG. 10) selecting the path (i.e., selecting far path 701 or close path 702). A discussion of the operation of exponent compare and path select logic 1000 is provided below.

For the exponent process, two pairs of exponents are summed by adders 1001A, 1001B and a greater exponent sum is selected by multiplexer 1003. Then, the bias is subtracted for the exponent result by subtractor 1004. The two exponent sums are compared to determine the greater one. The exponent comparison result is used for the significand swapping and the exponent difference is used for the alignment. Also, the path selection bit is determined by path select 709 based on the exponent difference and the operation as $$\text{path\_sel} = \begin{cases} 1 & \text{if } |AB_{exp} - CD_{exp}| \leq 2 \text{ or op\_sel} = 0 \\ 0 & \text{otherwise.} \end{cases} \quad (11)$$

Figure 11:
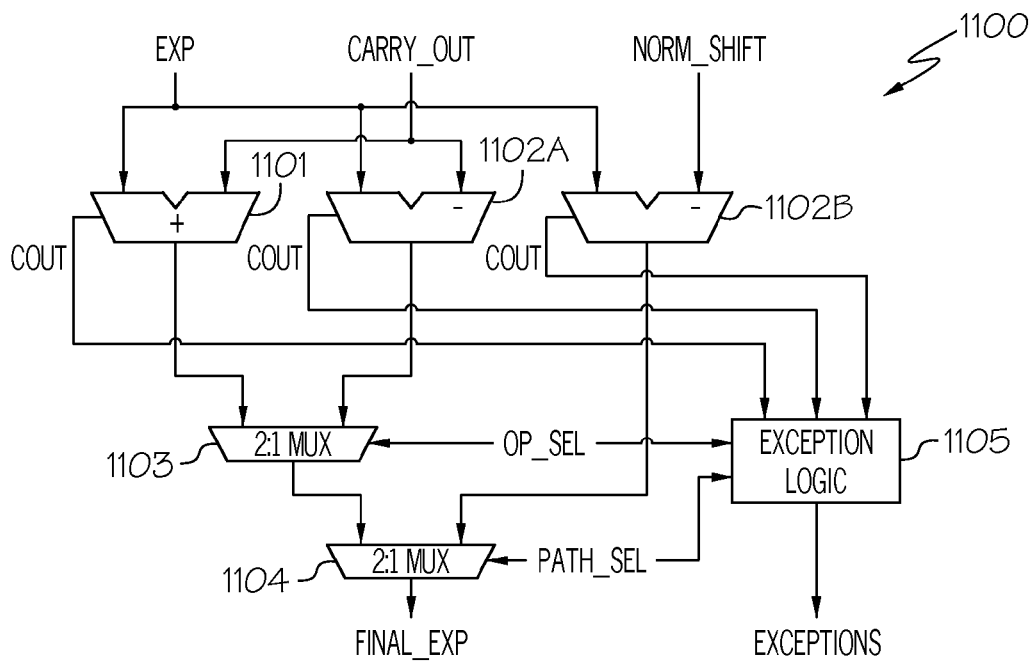
FIG. 11 illustrates the exponent adjust and selection logic in accordance with an embodiment of the present invention.

The exponent adjust and selection logic 1100 is shown in FIG. 11 in accordance with an embodiment of the present invention. Referring to FIG. 11, in conjunction with FIGS. 7-10, exponent adjust and selection logic 1100 includes an adder 1101 receiving the "exp" and "carry_out" signals as inputs, a subtractor 1102A receiving the "exp" and "carry_out" signals as inputs, and a subtractor 1102B receiving the "exp" and "norm_shift" signals as inputs. The sum provided by adder 1101 and the difference provided by subtractor 1102A are inputted to 2:1 multiplexer 1103 whose output is selected based on the "op_sel" signal. The output of multiplexer 1103 is inputted to another 2:1 multiplexer 1104, which receives the difference provided by subtractor 1102B. The output of multiplexer 1104 (identified as "final_exp" in FIG. 11) is selected based on the "path_sel" signal.

Exponent adjust and selection logic 1100 further includes an exception logic unit 1105 that receives as inputs, the sum generated by adder 1101 and the differences generated by subtractors 1102A, 1102B, and generates exceptions based on the value of the "op_sel" and "path_sel" signals. A discussion of the operation of adjust and selection logic 1100 is provided below.

FIG. 11 shows the exponent adjust logic, which adjusts the exponent by adding or subtracting the carry out from the significand addition. Since the four significands generate a carry out of up to 3, two carry out bits are used for the adjustment. The normalization shift amount is subtracted in case of the massive cancellation. Using the selection bits and the carry outs from the addition and subtractions, the exceptions are detected. The three exception cases specified in the IEEE-754 standard are detected as $$\text{overflow} = \begin{cases} 1 & \text{if exp} \geq \text{max\_exp} \\ 0 & \text{otherwise} \end{cases} \quad (12)$$

$$\text{underflow} = \begin{cases} 1 & \text{if exp} \leq 0 \\ 0 & \text{otherwise} \end{cases} \quad (13)$$

$$\text{inexact} = \text{overflow} || \text{underflow} || \text{round\_up}, \quad (14)$$

where round_up is the rounding decision of the significand result, and where || denotes the logical OR operation (as used in Verilog). Alternatively, EQ 14 could be rewritten inexact=overflow OR underflow OR roundup.

The sign logic determines the final sign bit that is also used in the round logic. The four sign bits of the operands, the input operator, the exponent comparison and the significand comparison are used to determine the sign bit as $$\text{sign} = \begin{cases} AB_{sign}CD_{sign} + AB_{sign}\overline{comp}_{exp} + \\ \quad AB_{sign}\overline{comp}_{signif} + \\ \quad CD_{sign}\overline{comp}_{exp}\overline{comp}_{signif} & \text{if } op = \text{add} \\ AB_{sign}\overline{CD}_{sign} + AB_{sign}\overline{comp}_{exp} + \\ \quad AB_{sign}\overline{comp}_{signif} + \\ \quad \overline{CD}_{sign}\overline{comp}_{exp}\overline{comp}_{signif} & \text{if } op = \text{sub.} \end{cases}$$

Figure 12:
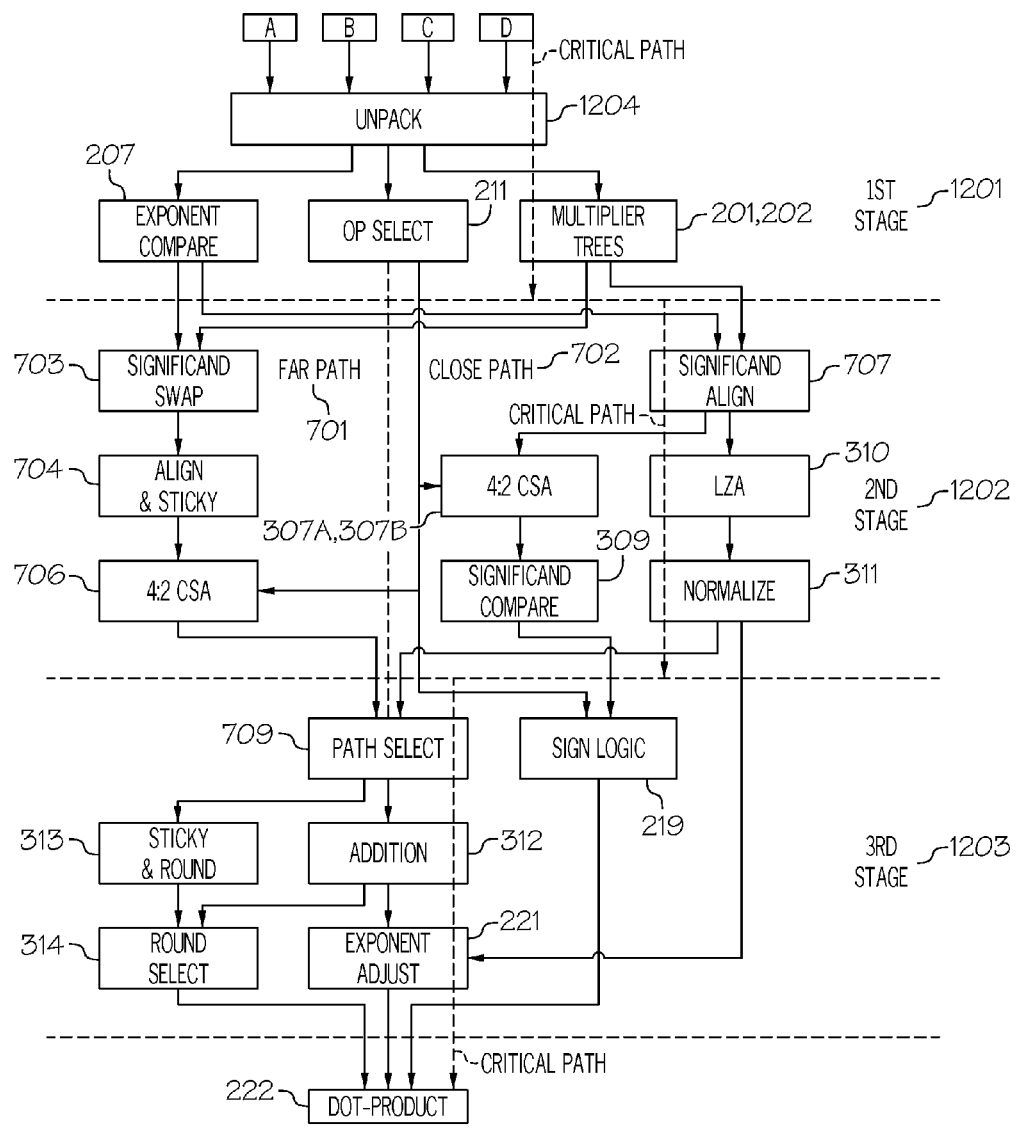
FIG. 12 illustrates the data flow and critical path of the dual-path floating-point fused dot product unit of FIG. 7 in accordance with an embodiment of the present invention.

As is well known, pipelining can improve the throughput of arithmetic units. In order to achieve the proper pipelining for the floating-point fused dot product unit, the arrangement of the components is investigated. FIG. 12 shows the data flow and critical path of the dual-path floating-point fused dot product unit 700 (FIG. 7) in accordance with an embodiment of the present invention. Referring to FIG. 12, in conjunction with FIGS. 7-11, based on the data flow analysis, the proposed dual-path floating-point fused dot product unit 700 can be split into three stages 1201, 1202, 1203. The first stage 1201 contains unpacking by unpack unit 1204, exponent compare logic 207, op select 211 and multiplier trees 201, 202. Since multiplier trees 201, 202 have a long latency, they occupy most of the latency of the first stage 1201. The second stage 1202 consists of the far path and close path logic 701, 702. Close path logic 702 takes a larger latency than far path logic 701 so that it becomes the critical path. The third stage 1203 contains the path selection 709, sign logic 219, significand addition 312, rounding 313, 314, and exponent adjust logic 221. In each pipeline stage, several logic components are performed in parallel and the path that takes the largest latency becomes the critical path. The critical paths of the three stages are First stage: Unpack→Multipliers Trees
Second stage: Close Path Significand alignment→LZA→Normalization
Third stage: Path Select→Significand Addition→Exponent Adjust.

Second stage 1202 takes the largest latency among the three pipeline stages so that the latency of second stage 1202 becomes the effective latency, which determines the throughput. Due to the latches and control signals between the pipeline stages 1201, 1202, 1203, the total latency of the pipelined dual-path floating-point fused dot product unit 700 is three times the latency of second stage 1202. However, the latencies of the three pipeline stages 1201, 1202, 1203 are fairly well balanced so that the throughput is significantly increased compared to the non-pipelined dual-path design.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:
1. A floating-point fused dot product unit, comprising:
a first multiplier tree adapted to multiply a first and second significand operands to produce a first significand pair;
a second multiplier tree adapted to multiply a third and fourth significand operands to produce a second significand pair;

a first multiplexer coupled to said first and second multiplier trees, wherein said first multiplexer is configured to select a smaller significand pair of said first and second significand pairs;
a second multiplexer coupled to said first and second multiplier trees, wherein said second multiplexer is configured to select a greater significand pair of said first and second significand pairs;
an alignment and sticky unit coupled to said first multiplexer, wherein said alignment and sticky unit is configured to align said smaller significand pair and perform sticky logic on said smaller significand pair to generate a first sticky bit; and
a sticky unit coupled to said second multiplexer, wherein said sticky unit is configured to perform sticky logic on said greater significand pair to generate a second sticky bit;
wherein least significant bits under said first and second sticky bits are discarded to thereby reduce a length of said first and second significand pairs.

2. The floating-point fused dot product unit as recited in claim 1 further comprising:
a first inverter coupled to said alignment and sticky unit, wherein said first inverter is configured to invert said aligned significand pair;
a second inverter coupled to said sticky unit, wherein said second inverter is configured to invert said greater significand pair.

3. The floating-point fused dot product unit as recited in claim 2 further comprising:
a first four-to-two carry save adder coupled to said first inverter and said sticky unit, wherein said first four-to-two carry save adder is configured to receive said inverted aligned significand pair and said greater significand pair to produce a first two significands.

4. The floating-point fused dot product unit as recited in claim 3 further comprising:
a second four-to-two carry save adder coupled to said second inverter and said alignment and sticky unit, wherein said second four-to-two carry save adder is configured to receive said inverted greater significand pair and said aligned significand pair to produce a second two significands.

5. The floating-point fused dot product unit as recited in claim 4 further comprising:
a comparison unit configured to compare said first two significands and a result of said comparison selects one of said first and second two significands to not be complemented after significand addition.

6. The floating-point fused dot product unit as recited in claim 5 further comprising:
a normalization unit configured to normalize said selected one of said first and second two significands.

7. The floating-point fused dot product unit as recited in claim 6 further comprising:
an adder coupled to said normalization unit, wherein said adder is configured to add most significant bits of said normalized significands.

8. The floating-point fused dot product unit as recited in claim 6 further comprising:
a sticky and round unit coupled to said normalization unit, wherein said sticky and round unit is configured to generate round, guard and sticky bits using least significant bits of said normalized significands.

9. The floating-point fused dot product unit as recited in claim 8, wherein a first and a second bit of said least significant bits correspond to said guard and round bits, wherein said sticky bit is set in response to at least one of a remaining of said least significant bits equaling a logical value of one.

10. The floating-point fused dot product unit as recited in claim 2 further comprising:
a four-input leading zero anticipation unit configured to receive four significands from said alignment and sticky unit and said sticky unit to obtain a count of leading zeros which is a shift amount of a normalization.

11. A floating-point fused dot product unit, comprising:
a first multiplier tree adapted to multiply a first and a second significand of a first and a second operand, respectively, to produce a first significand pair;
a second multiplier tree adapted to multiply a third and a fourth significand of a third and a fourth operand, respectively, to produce a second significand pair;
a far path comprising:
a first multiplexer configured to select a smaller significand pair of said first and second significand pairs;
a second multiplexer configured to select a greater significand pair of said first and second significand pairs;
a first alignment and sticky unit coupled to said first multiplexer, wherein said first alignment and sticky unit is configured to align said smaller significand pair and to perform sticky logic for said smaller significand pair;
a first inverter coupled to said first alignment and sticky unit, wherein said first inverter is configured to invert said aligned significand pair in response to an operation being a subtraction;
a sticky unit coupled to said second multiplexer, wherein said sticky unit is configured to perform sticky logic for said greater significand pair; and
a first four-to-two carry save adder coupled to said first inverter and said sticky unit, wherein said first four-to-two carry save adder is configured to receive said inverted aligned significand pair and said greater significand pair to produce a first two significands; and
a close path comprising:
a second alignment unit configured to align said first and second significand pairs;
a second inverter coupled to said second alignment unit, wherein said second inverter is configured to invert said aligned first significand pair;
a third inverter coupled to said second alignment unit, wherein said third inverter is configured to invert said aligned second significand pair;
a second four-to-two carry save adder coupled to said second inverter and said second alignment unit, wherein said second four-to-two carry save adder is configured to receive said inverted aligned first significand pair and said aligned second significand pair to produce a second two significands;
a third four-to-two carry save adder coupled to said third inverter and said second alignment unit, wherein said third four-to-two carry save adder is configured to receive said inverted aligned second significand pair and said aligned first significand pair to produce a third two significands;
a comparison unit configured to compare said second two significands and a result of said comparison selects one of said second and third two significands to not be complemented after significand addition; and
a normalization unit configured to normalized said selected one of said second and third two significands.

12. The floating-point fused dot product unit as recited in claim 11 further comprising:

a path select logic unit coupled to said far path and said close path, wherein said path select unit is configured to select one of said far path and said close path.

13. The floating-point fused dot product unit as recited in claim 12 further comprising:
an adder coupled to said path select logic unit, wherein said adder is configured to add most significant bits of either said normalized significands or said first two significands.

14. The floating-point fused dot product unit as recited in claim 13 further comprising:
a sticky and round unit coupled to said path select logic, wherein said sticky and round unit is configured to generate round, guard and sticky bits using least significant bits of either said normalized significands or said first two significands.

15. The floating-point fused dot product unit as recited in claim 14, wherein a first and a second bit of said least significant bits correspond to said guard and round bits, wherein said sticky bit is set in response to at least one of a remaining of said least significant bits equaling a logical value of one.

16. The floating-point fused dot product unit as recited in claim 15 further comprising:
a sign logic unit configured to generate a sign configured to determine a final sign bit that is used in round logic of said sticky and round unit; and
an exponent adjust unit configured to adjust an exponent by adding or subtracting a carry out from said significand addition;
wherein a third stage of said floating-point fused dot product unit contains said path select logic unit, said sign logic unit, said adder, said sticky and round unit and said exponent adjust unit.

17. The floating-point fused dot product unit as recited in claim 11 further comprising:
a four-input leading zero anticipation unit configured to receive four significands from said second alignment unit to obtain a count of leading zeros which is a shift amount of a normalization.

18. The floating-point dot fused dot product unit as recited in claim 11 further comprising:
an exponent compare unit configured to compare exponents of said first, second, third and fourth operands; and
an operand select unit configured to select one of said first, second, third and fourth operands;
wherein a first stage of said floating-point dot fused dot product unit contains said exponent compare unit, said operand select unit and said first and second multiplier trees.

19. The floating-point dot fused dot product unit as recited in claim 11, wherein a second stage of said floating-point dot fused dot product unit contains said far path and said close path logic.

* * * * *